(No Model.) 3 Sheets—Sheet 1.

H. A. STRONG.
WATER MOTOR.

No. 406,676. Patented July 9, 1889.

WITNESSES:
Dorn Turtchell
C. Sedgwick

INVENTOR:
H. A. Strong
BY Munn & Co.
ATTORNEYS.

(No Model.) 3 Sheets—Sheet 2.

H. A. STRONG.
WATER MOTOR.

No. 406,676. Patented July 9, 1889.

WITNESSES:
Don Twitchell
C. Sedgwick

INVENTOR:
H. A. Strong
BY Munn & Co.
ATTORNEYS.

(No Model.) 3 Sheets—Sheet 3.
H. A. STRONG.
WATER MOTOR.
No. 406,676. Patented July 9, 1889.
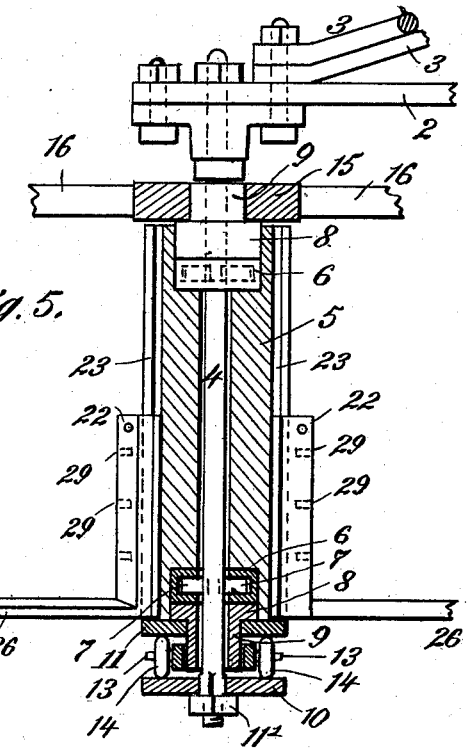
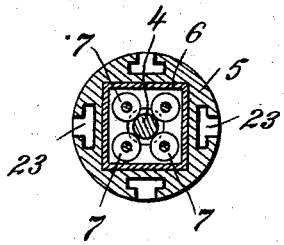
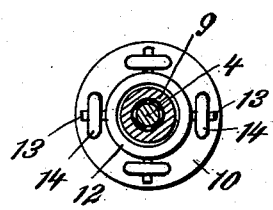
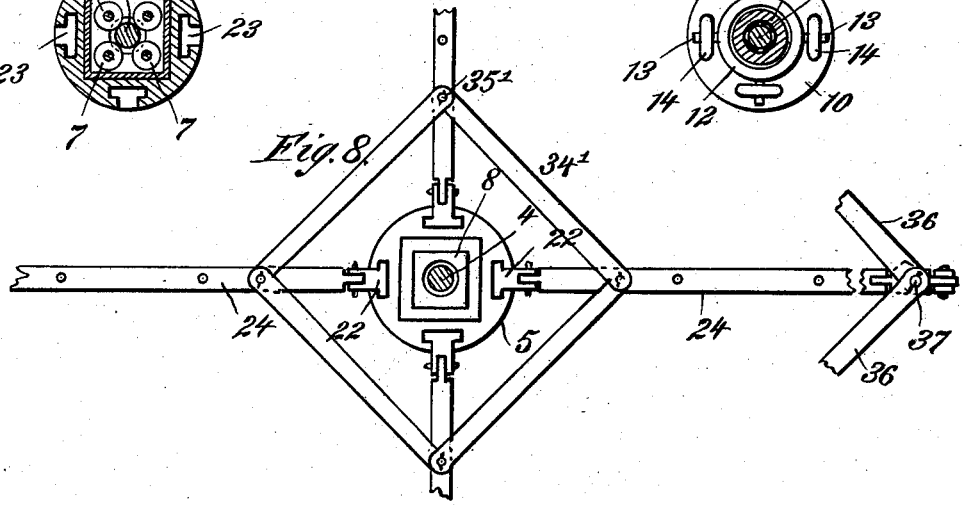
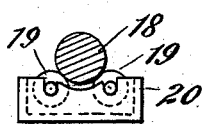
WITNESSES:
Donn Twitchell
C. Sedgwick
INVENTOR:
H. A. Strong
BY Munn & Co.
ATTORNEYS.
N. PETERS, Photo-Lithographer, Washington, D. C.

UNITED STATES PATENT OFFICE.

HUGO A. STRONG, OF NEW YORK, N. Y.

WATER-MOTOR.

SPECIFICATION forming part of Letters Patent No. 406,676, dated July 9, 1889.

Application filed August 31, 1888. Serial No. 284,280. (No model.)

*To all whom it may concern:*

Be it known that I, HUGO A. STRONG, of the city, county, and State of New York, have invented a new and Improved Water-Motor, of which the following is a full, clear, and exact description.

This invention relates to mechanisms for obtaining power by utilizing the force of the currents of a body of water or of a stream.

The invention has for its object to provide a durable and effective mechanism for this purpose, by means of which as large an amount of power as desired may be obtained.

The invention consists in a mechanism for utilizing the currents of a body of water or the current of a stream to obtain power, constructed and arranged as hereinafter described and claimed.

Reference is to be had to the accompanying drawings, forming a part of this specification, in which similar figures of reference indicate corresponding parts in all the views.

Figure 1:
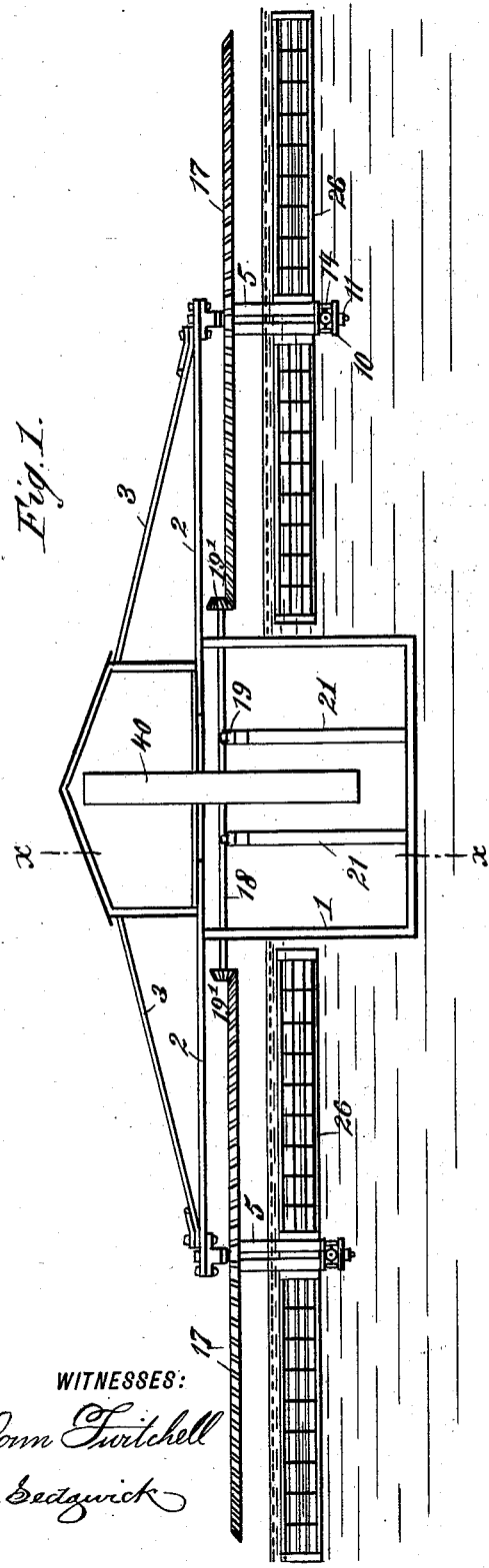
Figure 2:
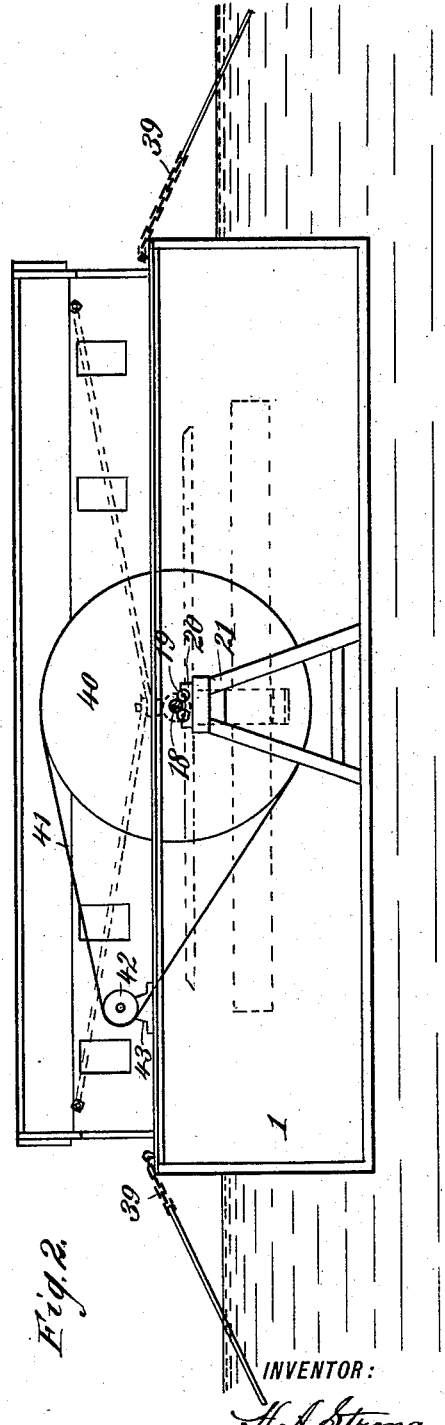
Figure 3:
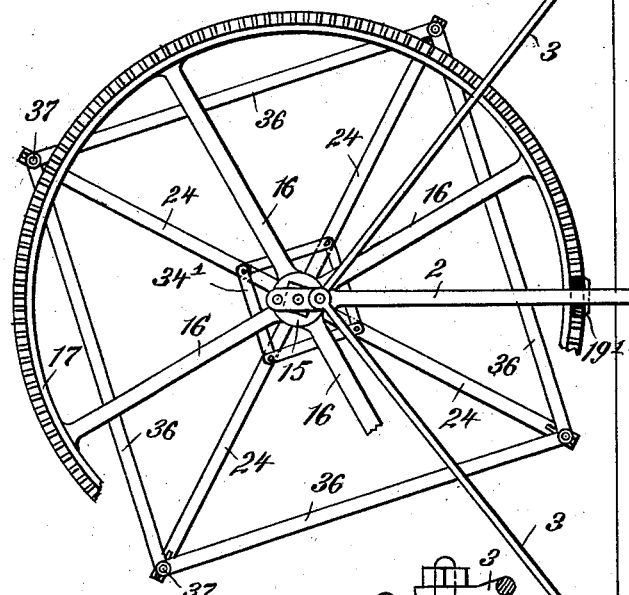
Figure 4:
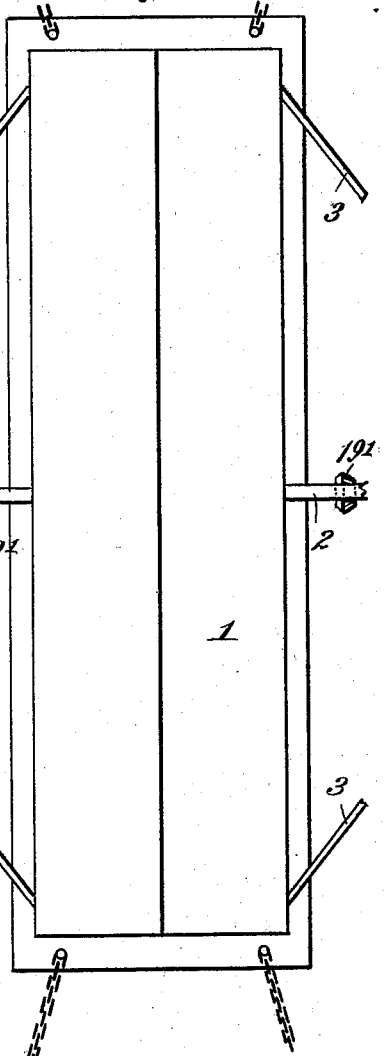
Figure 4:
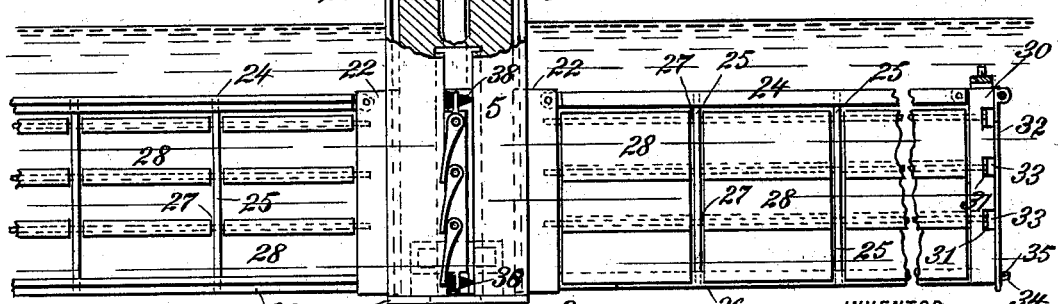

Figure 1 illustrates the invention in position for use. Fig. 2 is a sectional side view on the line $x$ $x$ of Fig. 1. Figs. 3 and 4 are views in plan and in elevation of a portion of the apparatus with parts broken away. Fig. 5 is a detail in vertical section. Fig. 6 is a horizontal section on the line $y$ $y$ of Fig. 4. Fig. 7 is a horizontal section on the line $z$ $z$ of Fig. 4. Fig. 8 is a detail in plan view with parts broken away; and Fig. 9 is a detail, partly in section, of a bearing.

In carrying out this invention a float is employed with a laterally-extending frame provided with horizontal water-wheels connected together by intermediate gearing. The driving-shaft connecting the water-wheels may be utilized in any desired way by a suitable connection to drive a mechanism on the land.

1 indicates a float constructed of any suitable size and shape. To suitable supports mounted on and extending laterally from the float 1—such as the iron arms 2 and the brace-rods 3—are attached horizontal water-wheels, preferably constructed as follows: Upon a vertical arm or rod 4, bolted at its upper end to an end of arm 2, is mounted a rotary casing 5, with sockets in its ends, fitted with a casing 6, having a series of friction-rollers 7 and a filling-block 8, with a neck or projection 9, the rod 4 projecting through perforations in casing 6, and block 8, and the rollers 7 serving as bearings for rod 4. To the lower square end of rod 4 is secured a plate 10, held thereon by a nut 11' on the rod 4, and between the plate 10 and a plate 11, encircling the neck 9, is located a roller-friction support for the casing 6, consisting of a ring 12, with arms 13, on which are mounted the anti-friction rollers 14.

On the neck 9 of upper block 8 is mounted the hub 15, from which radiate the spokes 16 of a bevel gear-wheel 17. The bevel gear-wheels 17 are connected by means of a shaft 18, mounted in the float 1 and resting on friction-rollers 19 in a casing 20 at the top of supports 21 in the float, and having bevel gear-wheels 19' at its ends meshing with the teeth of bevel gear-wheels 17.

The arms or wings of the water-wheels are constructed with T-shaped vertical metallic pieces 22, mounted in vertical T-shaped grooves 23 in the casing 6, and resting upon and held in place by the plate 11. To the upper end of T-shaped pieces 22 is hinged a bar 24, having depending arms 25, connected together at their lower ends by a bar 26, and provided with horizontal rods 27, to which are hinged plates 28, depending between the arms 25. The inner ends of rods 27 engage sockets 29 in the T-shaped pieces 22.

To the outer end of bar 24 is pivoted the upper end of a vertical piece 30, having recesses 31, into which project the ends of rods 27, extending through piece 30. The outer end of bar 26 extends through piece 30. The rods 27 and bar 26 are held in place by means of a bar 32, hinged to the upper end of piece 30, and having projections 33, which extend into the recesses 31 and bear against the ends of rods 27, the lower end of bar 32 engaging a slotted lug 34 on the end of bar 26 and held by a pin 35.

The wings of each water-wheel are braced by means of rods 34', extending between the adjacent bars 24 and detachably secured thereto by bolts and nuts 35'. The wings of each water-wheel are also braced by means of bars 36, extending between the outer end of bars 24 and engaging pins 37 thereon. With the wings constructed as herein described they can be readily taken apart when raised up for examination and repair.

In order to afford the least resistance to the current of water, the bars 26 are formed with a V-shaped edge 38 facing the direction of their movement. If desired, they may be formed with double-V-shaped edges. The plates 28 are hinged to rods 27, so that the plates of one wing will be forced open by the pressure of the water when the plates of another wing are held in closed position, the lower end of the plates resting against the next horizontal rod 27 beneath. By this means the wings not operated by the current are permitted to move through the water with a comparatively small amount of resistance. The float 1 may be anchored by chains 39 or other suitable means in a body of water or in a stream.

By having the plates 28 arranged on the wings to open in one direction only, the plates on one wheel opening in the opposite direction from those on the other, the water-wheels will always turn in the same direction, whatever may be the direction of the flow of the tide, and thereby permit the gear-wheels 17 and the bevel gear-wheels 19' to operate. The combined revolution of the water-wheels will impart great driving-power to the shaft 18 to drive any mechanism—as, for example, by means of a fly-wheel 40 thereon, connected by an endless band 41 with a pulley 42, mounted in a support 43, and operating a dynamo or other device. (Not shown.) The water-wheels constructed as described will be strong and serviceable, and by means of the several friction-roller bearings set forth will operate smoothly and rapidly.

While I have set forth a specific construction of parts, I do not intend to limit myself thereto, as the parts may be varied without departing from the essential features of the invention.

Having thus described my invention, I claim as new and desire to secure by Letters Patent—

1. A water-motor, consisting of a main frame, a horizontal driving-shaft mounted thereon, horizontal water-wheels suspended from frames projecting from the main frame, each water-wheel having a horizontal bevel gear-wheel geared with the driving-shaft, and having wings vertically movable on the axis of the water-wheel and formed with a series of hinged plates opening in one direction only, the several parts of the wings being detachable, substantially as described.

2. In a water-motor, a horizontal water-wheel constructed with vertical rod 4, a rotary casing 5, surrounding rod 4 and having external vertical T-shaped slots 23, the blocks 8, with necks 9 in their ends, the inclosed casings 6, with anti-friction rollers 7 bearing against rod 4, and anti-friction rollers 14, located between plates 10 and 11 at the bottom of casing 5, in combination with vertically-movable T-shaped pieces 22, located in slots 23, horizontal bars 24, hinged to pieces 22 and having depending arms 25, with bottom bar 26, and horizontal rods 27, having hinged thereto the overlapping plates 28, and the end vertical bar 30, fastened to bar 24, with recesses 31, into which rods 27 project, a bar 32, hinged to the upper end of bar 30, with projections 33, located in recesses 31 and secured to slotted lug 34 by pin 35, and the horizontal brace-bars 36, connecting with the ends of bars 24 and engaging pins 37 thereon, substantially as described.

3. In a water-motor, a horizontal water-wheel constructed with a vertical rod 4, and a rotary casing 5, mounted on rod 4 and having external vertical T-shaped slots 23, in combination with T-shaped wing-supports 22, engaging and vertically movable in slots 23, horizontal bars 24, connected by brace-rods 34' and bars 36 and hinged to supports 22, to swing upward thereon, and having depending arms 25, with bottom bar 26, and horizontal rods 27, having hinged thereto the detachable overlapping plates 28, the end vertical bar 30, fastened to bar 24 and having recesses 31, into which rods 27 project, and a bar 32, hinged to the upper end of bar 30, with projections 33, located in recesses 31 and secured to slotted lug 34 by pin 35, substantially as described.

4. In a water-motor, a main frame, a driving-shaft mounted in anti-friction roller-bearings thereon, and a horizontal water-wheel constructed with a vertical rod depending from the main frame, a rotary casing loosely mounted on the vertical rod and having anti-friction roller-bearings, vertically-movable wings mounted on the casing, with horizontal rods, and overlapping plates hinged to the rods and opening in one direction, and a horizontal bevel gear-wheel mounted on the casing and geared with the driving-shaft, substantially as described.

5. A water-motor consisting of float 1, having mounted therein the driving-shaft 18, resting on anti-friction rollers 19, and the supporting-frame consisting of laterally-extending bars 2 and brace-rods 3, the vertical rods 4, depending from the bars 2, rotary casings 5, mounted on rods 4, having anti-friction roller-bearings 7 and 14, water-wheel wings mounted on casings 5, vertically movable thereon, formed in detachable parts and having overlapping plates 28, and the bevel gear-wheels 17, mounted on casings 5 and geared with driving-shaft 18, substantially as described.

HUGO A. STRONG.

Witnesses:
 EDWARD W. CODY,
 C. SEDGWICK.